United States Patent [19]

Mao et al.

[11] Patent Number: 4,784,983

[45] Date of Patent: Nov. 15, 1988

[54] CATALYST SYSTEM FOR USE IN OLEFINIC POLYMERIZATION

[75] Inventors: Bingquan Mao; Aichun Yang; Ying Zheng; Juxiou Yang; Zhulan Li, all of Beijing, China

[73] Assignee: Beijing Research Institute of Chemical Industry, Beijing, China

[21] Appl. No.: 907,664

[22] Filed: Sep. 15, 1986

[51] Int. Cl.$^4$ .............................................. C08F 4/64
[52] U.S. Cl. .................................. 502/111; 502/104; 502/112; 502/121; 502/127; 526/125
[58] Field of Search ............... 502/104, 111, 112, 121, 502/127

[56] References Cited

FOREIGN PATENT DOCUMENTS 58-183708 10/1983 Japan.
2111066 6/1983 United Kingdom.

OTHER PUBLICATIONS

Derwent Abstracts, Week 8402, A17, p. 14 (1984).

*Primary Examiner*—Patrick P. Garvin
*Attorney, Agent, or Firm*—Morgan & Finnegan

[57] ABSTRACT

A catalyst system for use in olefinic polymerization and copolymerization is comprised of components (A), (B) and (C). The catalyst component (A) consisting essentially of titanium, magnesium, halogen, polycarboxylic acid esters and organic phosphorus compounds is a solid product, being prepared by mixing titanium tetrahalide and auxiliary precipitant with a homogeneous solution of magnesium halide in a solvent system consisting essentially of an organic epoxy compound and an organic phosphorus compound to form a solid product which is then treated with a polycarboxylic acid ester and titanium tetrahalide. Component (B) is an organic aluminum compound, and component (C) is an organic silicon compound. The catalyst system has a very high activity, and the resultant polymers have very high stereospecificity and good granular appearance.

15 Claims, No Drawings

CATALYST SYSTEM FOR USE IN OLEFINIC POLYMERIZATION

BACKGROUND OF THE INVENTION

The present invention relates to catalyst compositions and processes of preparing the same and a method of using the same in olefinic polymerization and copolymerization processes.

Great efforts have been made in increasing the activity of olefinic polymerization catalysts and improving the property of the product polymer. In recent years, tetravalent titanium compounds supported by magnesium compounds have been used as a catalyst in olefinic polymerization. These catalysts have relatively high activity. The use of a supporter apparently increases the efficiency of the active centers (titanium atoms) of the catalyst. For the polymerization of α-olefins having 3 or more carbon atoms, an electron donor must be added to the solid catalyst to ensure stereospecificity of the polymers.

One method of preparing an olefinic polymerization catalyst is by grinding or pulverization. Catalysts prepared by these methods have many disadvantages, such as poor granular appearance, wide particle size distribution and low activity. Another method of preparation has been proposed to overcome these disadvantages, i.e. by first dissolving a magnesium compound in solvents and then precipitating and separating the catalyst as a solid.

Japanese Laid-Open Patent No. 58-183708 describes the use of a mixture of organic epoxy compounds and organic phosphorus compounds to dissolve a magnesium compound, then adding a monocarboxylic acid ester and titanium tetrahalide to form a precipitate which is then used as a catalyst in an olefinic polymerization process.

The use of these catalysts overcome some of the disadvantages of catalysts prepared by grinding or pulverization. However, the activity of the catalysts is relatively low, and during extended periods of polymerization time, the activity of the catalyst decreases significantly. Moreover, both apparent density and stereospecificity of the resultant polymers are not sufficiently high; the polymer has an unpleasant odor and the quality of polymers is affected because of the presence of a large amount of residual Cl− ions. All the above-mentioned problems remain to be solved.

Japanese Laid-Open Patent No. 58-83006 describes using alcohols, aldehydes, amides and carboxylic acids to dissolve a magnesium compound, then adding benzoic anhydride and a dicarboxylic acid ester to prepare a solid catalyst. Although the catalyst thus prepared has improved activity and the product polymer has better granular appearance, the process of preparing the catalyst requires severe operating conditions. The temperature for dissolving the magnesium compound is high, the rate of dissolution is slow, and the viscosity of the resultant magnesium compound solution is so high that operation is difficult. Further, the efficiency of the autoclave used for polymerization is low, and environmental pollution results from the use of large amounts of titanium tetrachloride as the starting material.

SUMMARY OF THE INVENTION

The present invention provides catalyst compositions suitable for use in olefinic polymerization and copolymerization. The catalyst composition has high activity, and during extended periods of polymerization time, the catalyst shows little reduction in activity. The resultant polymer products have good granular appearance, narrow particle size distribution and high apparent density. Moreover, for polymers of olefins with 3 or more carbon atoms, the stereospecificity is high and shows very little decrease as the melt indexes increase. The polymers produced from the process are also free of unpleasant odor, contains very low amount of Cl− ions and are not corrosive to the equipment. Other advantages include ease of operation, lower material consumption, efficient use of the apparatus and decreased environmental pollution during the catalyst preparation process.

The catalyst composition of the present invention for use in olefinic polymerization comprise components (A) and (B) and optionally (C).

The present invention further provides a process of preparing the catalyst composition, particularly a process of preparing component (A) of the catalyst composition.

The present invention also provides a method of using the catalyst composition in olefinic polymerization.

Component (A) is a solid prepared by the following method:

Magnesium halide is first dissolved into a homogeneous solution by mixing with organic epoxy compounds and organic phosphorus compounds. The resultant solution is then mixed with titanium tetrahalide or a derivative thereof, followed by adding an auxiliary precipitant such as an organic anhydride, organic acid, ether, ketone and the like to form a precipitate. The precipitate is then treated with a polycarboxylic acid ester which is loaded on the solid precipitate. After separation, the solid precipitate is then treated with titanium tetrahalide and an inert diluent to obtain a solid catalyst component (A) consisting essentially of titanium, magnesium, halogen, polycarboxylic esters and organic phosphorus compounds.

Component (B) is an organic aluminum compound and component (C) is an organic silicon compound.

DETAILED DESCRIPTION OF THE INVENTION

The present invention is described in details as follows.

1. Preparation of the magnesium halide solution

The magnesium halide solution herein means a uniform solution obtained by dissolving a magnesium halide in a solvent system consisting essentially of organic epoxy compounds and organic phosphorus compounds. The solvent system may include inert diluents.

The particle size of the magnesium halide used is preferred to be such that it is easily dissolved with stirring. The dissolution temperature is about 0° C.–100° C., preferably from 30° C.–70° C. Inert diluents such as hexane, heptane, octane, benzene, toluene, xylene, 1,2-dichloroethane, chlorobenzene and other hydrocarbons or halohydrocarbons can be added into the solvent system; with benzene, toluene and xylene being preferred. The most preferred diluent is toluene. The amount of epoxy compounds added is about 0.1–10.0 moles, preferably 0.5–4.0 moles, per mole of magnesium halide; and the amount of organic phosphorus compounds added is about 0.1–3.0 moles, preferably 0.3–1.0 moles, per mole of magnesium halide.

Suitable magnesium halides include magnesium chloride, magnesium bromide, magnesium iodide and complexes of magnesium dihalide with water or alcohol and the like, and derivatives of magnesium dihalide wherein a halogen atom is substituted by a hydrocarboxyl group or a halohydrocarboxyl group, the most preferred being magnesium chloride.

Suitable organic epoxy compounds include oxides of aliphatic olefines, diolefins, halogenated aliphatic olefins, and diolefins, glycidyl ethers, cyclic ethers and the like having 2–8 carbon atoms. Examples of suitable organic epoxy compounds are ethylene oxide, propylene oxide, butylene oxide, butadiene oxide, butadiene dioxide, epoxy chloropropane, methylglycidyl ether, diglycidyl ether, and the like. Ethylene oxide, propylene oxide and epoxy chloropropane are preferred, with epoxy chloropropane being the most preferred.

Suitable organic phosphorus compounds include hydrocarbon esters of phosphoric acid or phosphorous acid, e.g. trimethyl phosphate, triethyl phosphate, tributyl phosphate, triphenyl phosphate, trimethyl phosphite, triethyl phosphite, tributyl phosphite, triphenyl phosphite and the like; with trimethyl phosphate, triethyl phosphate and tributyl phosphate being preferred, with tributyl phosphate being the most preferred.

2. Precipitation of the solids

The magnesium halide solution obtained by the above-mentioned procedure is mixed with liquid titanium tetrahalide to form a solid precipitate in the presence of an auxiliary precipitant. A polycarboxylic acid ester may be added before, during or after the precipitation of the solids and loaded on the solid.

The process of solids precipitation can be carried out by one of two methods. One method involves mixing liquid titanium tetrahalide with magnesium halide at a temperature in the range of about $-40°$ C. to $0°$ C., and precipitating the solids while the temperature is raised slowly to a range of about $30°$ C.–$120°$ C., preferably $60°$ C.–$100°$ C. The other method involves adding liquid titanium tetrahalide dropwise into the homogeneous magnesium halide solution at room temperature to precipitate out solids immediately. In both methods, an auxiliary precipitant must be present in the reaction system. The auxiliary precipitant can be added either after the magnesium halide solution is obtained or together with magnesium halide in step 1. Alternatively, two or more auxiliary precipitants can be added simultaneously.

The solids are treated by adding a polycarboxylic acid ester into the system after the precipitation process. Alternatively, a polycarboxylic acid ester can be added during the precipitation process. A mixture of two or more polycarboxylic acid esters can be used.

In order to obtain uniform solid particles, the process of precipitation should be carried out slowly. When the second method of adding titanium halide dropwise at room temperature is applied, the process should preferably take place over a period of from about 1 hour to 6 hours. When the first method of raising the temperature in a slow manner is applied, the rate of temperature increase preferably ranges from about $4°$ C. to about $100°$ C. per hour.

The mole ratios of various components per mole of magnesium halide in this step are as follows: titanium halide, 0.5–150, preferably 1–20; auxiliary precipitant, 0.03–1.0, preferably 0.05–0.4; polycarboxylic acid ester, 0.03–2.0, preferably 0.1–0.5.

The liquid titanium tetrahalide or its derivatives used in this step can be in the pure liquid state, or in a solution of inert diluents, having the general formula $TiX_n(OR)_{4-n}$, wherein X is a halogen, R is a hydrocarbon group being identical or different, and n is an integer of from 0 to 4. Examples of the compounds are titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium and the like. Titanium tetrachloride is the most preferred.

The auxiliary precipitants according to this invention include organic anhydrides, organic acids, ketones, ethers and the like, such as acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, methyl ether, ethyl ether, propyl ether, butyl ether, amyl ether and the like. The organic anhydrides are preferred, with phthalic anhydride being the most preferred.

Polycarboxylic acid esters suitable for this invention include aliphatic, aromatic and alicyclic polycarboxylic acid esters. Examples of these esters include diethyl malonate, dibutyl malonate, diethyl adipate, dibutyl adipate, diethyl sebacate, dibutyl sebacate, di-n-butyl phthalate, di-isobutyl phthalate, di-isooctyl phthalate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl pyromellitate, tetrabutyl pyromellitate, diethyl 1,2-cyclohexane-dicarboxylate, dibutyl-1,2-cyclohexane-dicarboxylate, wherein di-n-butyl phthalate and di-isobutyl phthalate are preferred.

3. Treatment and washing of the solid precipitate

The solid precipitate is first separated from the mixture. In the solid precipitate thus obtained is entrained a variety of complexes and impurities, so that further treatment is necessary.

The solid precipitate are washed with an inert diluent and then treated with titanium tetrahalide or a mixture of titanium tetrahalide and an inert diluent. The titanium tetrahalide used in this step is also of the general formula $TiX_n(OR)_{4-n}$ being identical to or different with the titanium tetrahalide used in step 2, with titanium tetrachloride being the most preferred. The amount of titanium tetrahalide used is 1 to 20 moles, preferably 2 to 15 moles, per mole of magnesium halide. The treatment temperature ranges from $50°$ C. to $150°$ C., preferably from $60°$ C. to $100°$ C. If a mixture of titanium tetrahalide and inert diluent is used to treat the solid precipitate, the volume % of titanium tetrahalide in the treating solution is 10–100 percent, preferably 20–80 percent, the rest being an inert diluent.

The treated solids are further washed with an inert diluent to remove ineffective titanium compounds and other impurities.

The inert diluent herein used can be hexane, heptane, octane, 1,2-dichloroethane, benzene, toluene and other hydrocarbons. 1,2-dichloroethane is the most preferred diluent in the final washing step.

4. Characteristics and chemical composition of the solid catalyst component (A)

Component (A) according to the present invention thus obtained through the above described steps 1, 2 and 3, can be used as a solid or as a suspension.

The solid component (A) obtained according to this invention is in the form of solid particles, with an average particle size of 2-20 microns, with a high specific surface area of more than 50M²/g, preferably more than 200M²/g. The particle size of component (A) can be controlled by altering the preparing conditions.

The solid catalyst component (A) has the following chemical composition: titanium, 1.5-6.0 wt %; magnesium, 10-20 wt %; halogen, 40-70 wt %; polycarboxylic acid ester, 5-25 wt %; organic phosphorus compounds, 0.1-2.5 wt %; and inert diluent 0-15 wt %.

The catalyst system according to this invention comprises components (A), (B) and optionally (C).

Component (B) is an organic aluminum compound, having the general formula $AlR_{n'}X_{3-n'}$ wherein R is hydrogen, or a hydrocarbon group having 1-20 carbon atoms, preferably an alkyl, aralkyl or aromatic group; X is halogen, preferably chlorine or bromine; and n' is an integer of from 1 to 3. Examples of the compounds are trialkyl aluminums such as trimethyl aluminum, triethyl aluminum, tri-isobutyl aluminum, trioctyl aluminum; hydrogenated alkyl aluminums such as diethyl aluminum hydride, di-isobutyl aluminum hydride; halogenated alkyl aluminums such as diethyl aluminum chloride, di-isobutyl aluminum chloride, ethyl aluminum sesquichloride, ethyl aluminum dichloride; with triethyl aluminum and tri-isobutyl aluminum being preferred.

The organic aluminum compound is used in the catalyst composition in such an amount that the mole ratio of aluminum to titanium in solid component (A) is about 5-5000, preferably about 20-500.

Component (C) is an organic silicon compound having the general formula $R_{n'}Si(OR')_{4-n'}$ wherein n' is an integer of from 0 to 3; R and R' are alkyl, cycloalkyl, aryl, or alkyl group substituted by halogen, R and R' may be identical or different. R can also be halogen or hydrogen. Examples of such compounds are trimethyl methoxysilane, trimethyl ethoxysilane, trimethyl phenoxysilane, dimethyl dimethoxysilane, dimethyl diethoxysilane, diphenyl dimethoxysilane, diphenyl diethoxysilane, phenyl triethoxysilane, phenyl trimethoxysilane, and the like. Preferred compounds are diphenyl dimethoxysilane, diphenyl diethoxysilane, dimethyl dimethoxysilane and dimethyl diethoxysilane, with diphenyl dimethoxysilane and diphenyl diethoxysilane being the most preferred.

The organic silicon compound is used in the catalyst composition in such an amount that the mole ratio of the organic aluminum compound to organic silicon compound is about 2-100, preferably 5-40.

In general, component (C) is added in the polymerization of propylene.

It is suitable to employ the catalyst system of this invention in the polymerization of α-olefins, e.g. ethylene, propylene, 1-butylene, 4-methyl-1-pentene, 1-hexylene, 1-octylene and the like. Homopolymerization as well as atactic copolymerization and block copolymerization of these olefins can be carried out using the catalyst system of the present invention. Conjugated diene or nonconjugated diene can be selected as a monomer in copolymerization.

Liquid-phase polymerization and gas-phase polymerization can both be employed. An inert solvent selected from saturated aliphatic or aromatic hydrocarbons such as hexane, heptane, cyclohexane, naphtha, extract oil, hydrogenated gasoline, kerosene, benzene, toluene and xylene can be used as the reaction medium in liquid-phase polymerization. The olefin itself can also act as the reaction medium. Prepolymerization can be conducted before polymerization. Polymerization can be carried out in batch mode, semi-continuous or continuous mode.

The polymerization takes place at a temperature ranging from room temperature to about 150° C., preferably from about 50° C. to 100° C. Hydrogen gas can be used as a molecular weight regulator.

To further illustrate this invention, and not by way of limitation, the following eamples and comparative examples are given.

EXAMPLE 1

1. Preparation of a solid catalyst component (A):

Anhydrous magnesium chloride (0.05 mol), toluene (75 ml), epoxy chloropropane (0.1 mol) and tributyl phosphate (0.03 mol) were introduced into a reactor which had thoroughly been purged with highly purified nitrogen. The temperature was raised to 50° C. with stirring, and the mixture was then maintained at this temperature for 2 hours, while the solids dissolved completely. Phthalic anhydride (0.008 mol) was added to the solution, and then the solution was maintained for an additional 1 hour at 50° C. The solution was cooled to −25° C. Titanium tetrachloride (55 ml) was added dropwise over the course of 1 hour. The solution was heated to 80° C. over the course of 3 hours, while a solid product precipitated. Diisobutyl Phthalate (0.0125 mol) was added and the mixture was maintained at the temperature of 80° C. for 1 hour.

The solid portion was collected by filtration and washed with toluene (2×100 ml). A brown-yellow solid precipitate was obtained. The solid was then treated with a mixture of toluene (60 ml) and titanium tetrachloride (40 ml) for 2 hours at 90° C. After the filtrate was removed, the treatment step as repeated. The solid was washed with dichloroethane (100 ml), and then with hexane (4×100 ml).

The solid catalyst component (A) obtained by the above procedure contained 1.92% by weight of titanium, 17.5% by weight of magnesium, 56.5% by weight of chlorine, 13.2% by weight of diisobutyl phthalate, 0.32% by weight of tributyl phosphate. The specific surface area of it was 290 M²/g.

2. Solution polymerization

Industrial grade hexane (800 ml), triethyl aluminum (0.0025 mol), diphenyl dimethoxysilane (0.000125 mol) and 0.5 mg, calculated as the titanium atom, of solid catalyst component (A) prepared as above were introduced into a 2-liter stainless steel autoclave which had been thoroughly purged with propylene. After introducing 0.4 l l (standard volume) of hydrogen, the temperature was raised to 70° C. Propylene was introduced into the autoclave and a pressure of 7 kg/cm²(G) was maintained. The temperature was maintained at 70° C. Propylene was polymerized for 2 hours. The amount of the resulting polymer was 435g. The particle size distribution of the polymer is shown in Table 1 and other results are shown in Table 2.

EXAMPLE 2

Example 1 was followed except that the dichloroethane used in washing step was changed to hexane. The results were shown in Table 2.

COMPARATIVE EXAMPLE 1

1. Preparation of a solid catalyst component:

Anhydrous magnesium chloride (0.05 mol), toluene (75 ml), epoxy chloropropane (0.1 mol) and tributyl phosphate (0.03 mol) were introduced into a reactor which had been thoroughly purged with highly purified nitrogen. The temperature was raised to 50° C. with stirring, and the mixture was maintained at this temperature for 2 hours, while the solids dissolved completely. The solution was cooled to −25° C. Titanium tetrachloride (0.45 mol) was added to the solution dropwise over the course of 1 hour, and then ethyl benzoate (0.015 mol)was added. The solution was heated to 80° C. over the course of 3 hours, while the solid product was precipitated. The mixture was maintained for 1 hour at 80° C.

The solid portion was collected by filtration and washed with toluene (2×100 ml). A brown-yellow solid procipitate was obtained. The solid was treated with a mixture of toluene (50 ml) and titanium tetrachloride (0.45 mol) for 2 hours at 90° C. After the filtrate was removed, the treatment step was repeated. The solid was washed five times with hexane. A solid catalyst component (A) was obtained.

2. Solution polymerization

Industrial grade hexane (800 ml), triisobutyl aluminum (0.003 mol), ethyl aluminum sesquichloride (0.001 mol), methyl p-methyl bezoate (0.0004 mol) and 0.5 mg, calculated as the titanium atom, of the catalyst component prepared in Comparative Example 1 were introduced into a 2-liter stainless steel autoclave which had been thoroughly purged with propylene. After introducing 0.4 l (standard volume) of hydrogen, the temperature was raised to 70° C. Propylene was introduced continuously into the autoclave to maintain the pressure at 7 kg/cm$^2$(G). The temperature was maintained at 70° C. Propylene was polymerized for 2 hours. The amount of the resulting polymer was 159 g. The particle size distribution of the polymer is shown in Table 1, other results are shown in Table 2.

COMPARATIVE EXAMPLE 2

The polymerization procedure described in Example 1 was followed except that the solid catalyst component prepared in Example 1 was changed to one prepared as in Comparative Example 1. The results were shown in Table 2.

COMPARATIVE EXAMPLE 3

The polymerization procedure described in Comparative Example 1 was followed except that the solid catalyst component prepared in Comparative Example 1 was changed to one prepared in Example 1 and triisobutyl aluminum and ethyl aluminum sesquichloride were not added to hexane. The results are shown in Table 2.

COMPARATIVE EXAMPLE 4

The polymerization procedure described in Comparative Example 1 was followed except that the solid catalyst component prepared in Comparative Example 1 was changed to one prepared in Example 2 and triisobutyl aluminum and ethyl aluminum sesquichloride were not added to hexane. The results are shown in Table 2.

Comparative Examples 2, 3 and 4 illustrate that if the catalyst component (A) of the present invention is not used together with components (B) and (C), the polymerization results are not satisfactory.

COMPARATIVE EXAMPLE 5

The same amounts as in Example 1 of anhydrous magnesium chloride, toluene, epoxy chloropropane and tributyl phosphate were introduced into a reactor which had throughly been purged with highly purified nitrogen. The mixture was heated to 50° C. with stirring, and maintained at this temperature for 2 hours, while the solid dissolved completely. The solution was maintained for additional 1 hour at 50° C. and then cooled to −25° C. Titanium tetrachloride (55 ml) was added dropwise over the course of 1 hour. The solution was heated to 80° C. over the course of 3 hours. No solid precipitate was detected.

Diisobutyl phthalate (0.0125 mol) was added, and the mixture was maintained for 2 hours at 80° C. The result was a colloidal solution, and no solid precipitate was obtained.

COMPARATIVE EXAMPLE 6

Comparative Example 5 was followed except that diisobutyl phthalate was added immediately after the addition of titanium tetrachloride. The result was a colloidal solution, and no solid precipitate was obtained.

Referring to Comparative Example 5 and 6, it was found that only colloidal solutions were formed and no solid precipitate separated out when the monocarboxylic acid ester is replaced by a polycarboxylic acid ester in Japanese Laid-Open Patent No. 58-183708.

TABLE 1

| Example No. | Particle Size Distribution of Polymer | | | | | | |
|---|---|---|---|---|---|---|---|
| | >840μ | >350μ | >210μ | >177μ | >105μ | >74μ | <74μ |
| Ex. 1 | 0.2 | 74.2 | 22.8 | 3.0 | 2.2 | 0.6 | 0 |
| Co. Ex. 1 | 1.0 | 36 | 35 | 10.2 | 10 | 4.8 | 5.2 |

TABLE 2

| Example No. | Ti content of catalyst (wt %) | Efficiency of catalyst (Kg-PP/g-Ti)* | II (%)** of the white powdery polymer | II (%) of the entire polymer | Melt index of polymer (g/10 min) | Bulk density polymer (g/ml) |
|---|---|---|---|---|---|---|
| Ex. 1 | 1.92 | 870 | 98.4 | 97.7 | 5.7 | 0.45 |
| Ex. 2 | 3.08 | 482 | 97.6 | 96.6 | 10.5 | 0.42 |
| Co. Ex. 1 | 3.19 | 352 | 96.8 | 94.5 | 2.4 | 0.41 |
| Co. Ex. 2 | 3.19 | 341 | 88.7 | 83.1 | 9.6 | 0.37 |
| Co. Ex. 3 | 1.92 | 450 | 89.7 | 85.1 | 28.1 | 0.36 |
| Co. Ex. 4 | 3.08 | 340 | 88.4 | 84.0 | 40.8 | 0.34 |

*kg-PP/g-Ti = kg-polypropylene/g-Ti
**II = Isotacticity Index after extraction from heptane.

EXAMPLE 3-4

Example 1 was followed except that the polymerization time was changed to 4 hours and 6 hours, respectively. The results were shown in Table 3.

TABLE 3

| Example No. | polymerization time (hours) | Efficiency of catalyst (Kg-PP/g-Ti) | II (%) of the white powdery polymer | II (%) of the entire polymer | Melt index of polymer (g/10 min) | Bulk density polymer (g/ml) |
|---|---|---|---|---|---|---|
| Ex. 1 | 2 | 870 | 98.4 | 97.7 | 5.7 | 0.45 |
| Ex. 3 | 4 | 1290 | 97.9 | 97.3 | 4.7 | 0.44 |
| Ex. 4 | 6 | 1620 | 97.8 | 97.2 | 6.7 | 0.45 |

EXAMPLE 5

A solid catalyst component (A) was prepared in the same manner as in Example 1 except that the amount of phtalic anhydride added was changed to 0.04 mol. It was found that the particles of the solid precipitate were very fine. A large amount of the solid particles passed through the filter cloth. The amount of the resulting solid catalyst component (A) was only 1.1 g. Propylene was polymerized in the same way as in Example 1 using the resulting solid catalyst component (A). The results were shown in Table 4.

EXAMPLE 6

A solid catalyst component (A) was prepared in the same manner as in Example 1 except that the amount of phthalic anhydride added was changed to 0.012 mol. The amount of the resulting solid catalyst component (A) was 6.6 g, but Ti content of the catalyst was only 1.53 wt %. Propylene was polymerized in the same way as in Example 1 using the resulting solid catalyst component (A). The results were shown in Table 4.

EXAMPLE 7-8

A solid catalyst component (A) was prepared in the same manner as in Example 1 except that the diisobutyl phthalate was changed to dibutyl phthalate and diisooctyl phthalate, respectively. Propylene was polymerized in the same way as in Example 1 using the resulting solid catalyst component (A). The results were shown in Table 4.

EXAMPLE 9-10

A solid catalyst component (A) was prepared in the same manner as in Example 1 except that the phthalic anhydride was changed to maleic anhydride and pyromellitic dianhydride, respectively. Propylene was polymerized in the same way as in Example 1 using the resulting solid catalyst component (A). The results were shown in Table 4.

EXAMPLE 11-13

Triethyl aluminum (0.0008 mol), diphenyl dimethoxysilane (0.0001 mol) and 0.2 mg, calculated as the titanium atom, of the solid catalyst component (A) prepared in Example 1 were introduced into a 5-liter stainless steel autoclave which had thoroughly been purged with propylene. Liquid propylene (2.5 l) was introduced into the autoclave, and then 1.0 l (standard volume) of hydrogen was introduced. The polymerization temperature was changed to 60° C., 70° C. and 80° C., respectively. The polymerization time is 2 hours. The results were shown in Table 5.

TABLE 5

| Example No. | polymerization temperature (°C.) | Efficiency of catalyst (Kg-PP/g-Ti) | II (%) of the entire polymer | Melt index of polymer (g/10 min) | Bulk density polymer (g/ml) |
|---|---|---|---|---|---|
| Ex. 11 | 60 | 1590 | 96.3 | 4.3 | 0.44 |
| Ex. 12 | 70 | 2790 | 97.9 | 3.0 | 0.45 |
| Ex. 13 | 80 | 3290 | 99.7 | 1.4 | 0.46 |

EXAMPLE 14-16

Propylene was polymerized in the same way as in Example 13 except that the amount of hydrogen used in the polymerization was changed to 1.0 l (standard volume), 2.0 l, 3.2 l and 4.0 l respectively. The results were shown in Table 6.

TABLE 6

| Example No. | Amount of hydrogen liter (standard volume) | Efficiency of catalyst (Kg-PP/g-Ti) | II (%) of the entire polymer | Melt index of polymer (g/10 min) | Bulk density polymer (g/ml) |
|---|---|---|---|---|---|
| Ex. 13 | 1.0 | 3290 | 98.7 | 1.4 | 0.46 |
| Ex. 14 | 2.0 | 4120 | 98.0 | 5.5 | 0.46 |
| Ex. 15 | 3.2 | 4430 | 97.8 | 12.4 | 0.46 |
| Ex. 16 | 4.0 | 4200 | 97.5 | 14.9 | 0.46 |

EXAMPLE 17-22

Proylene was polymerized in the same way as in Example 13 except that the amount of liquid propylene was changed to 3.0 l and the polymerization time was changed to 0.5 hour, 1.0 hour, 2.0 hours, 3.5 hours, 5.0

TABLE 4

| Example No. | Ti content of catalyst (wt %) | Efficiency of catalyst (Kg-PP/g-Ti) | II (%) of the white powdery polymer | II (%) of the entire polymer | Melt index of polymer (g/10 min) | Bulk density polymer (g/ml) |
|---|---|---|---|---|---|---|
| Ex. 5 | 3.08 | 410 | 97.8 | 97.4 | 4.8 | 0.32 |
| Ex. 6 | 1.53 | 801 | 97.6 | 96.9 | 10.4 | 0.40 |
| Ex. 7 | 2.04 | 1040 | 96.6 | 96.2 | 7.1 | 0.42 |
| Ex. 8 | 2.24 | 536 | 95.8 | 94.4 | 9.5 | 0.38 |
| Ex. 9 | 2.77 | 406 | 96.6 | 94.5 | 7.1 | 0.34 |
| Ex. 10 | 4.14 | 268 | 93.7 | 91.1 | 37.4 | 0.34 | hours and 7.0 hours, respectively. The results were shown in Table 7.

TABLE 7

| Example No. | polymerization time (hours) | Efficiency of catalyst (Kg-PP/g-Ti) | II (%) of the entire polymer | Melt index of polymer (g/10 min) | Bulk density polymer (g/ml) |
|---|---|---|---|---|---|
| Ex. 17 | 0.5 | 1700 | 98.0 | 2.1 | 0.45 |
| Ex. 18 | 1.0 | 2520 | 98.5 | 1.9 | 0.46 |
| Ex. 19 | 2.0 | 3270 | 98.6 | 1.0 | 0.46 |
| Ex. 20 | 3.5 | 4130 | 99.1 | 0.62 | 0.46 |
| Ex. 21 | 5.0 | 5260 | 99.2 | 0.41 | 0.46 |
| Ex. 22 | 7.0 | 6190 | 99.3 | 0.27 | 0.46 |

EXAMPLE 23

Triethyl aluminum (0.00125 mol), diphenyl dimethoxysilane (0.0001 mol) and 0.2 mg, calculated as the titanium atom, of the solid catalyst component (A) prepared in Example 1 were introduced into a 5-liter stainless steel autoclave which had thoroughly been purged with propylene. Liquid propylene (2.5 l) was introduced into the autoclave, and then 1.4 l (standard volume) of hydrogen was introduced. The temperature was raised to 80° C., and propylene was polymerized for 2 hours. After the unreacted propylene was purged out of the autoclave, ethylene was introduced to maintain the pressure at 3 kg/cm$^2$(G). The temperature was maintained at 70° C.

Gas phase polymerization was carried out for 2 hours. The amount of the resulting powdery polymer was 720 g. The efficiency of the catalyst was 3600000 g-polymer/g-Ti. The ethylene content of the polymer was 13.9 mol %. The polymer had a melt index of 2.96 g/10 min and a bulk density of 0.45 g/ml.

EXAMPLE 24-25

Industrial grade hexane (1000 ml), triethyl aluminum (0.002 mol) and 0.2 mg, calculated as the titanium atom, of the solid catalyst component (A) prepared in Example 7 were introduced into a 2-liter stainless steel autoclave which had thoroughly been purged with hydrogen. The temperature was raised to 85° C. Hydrogen was introduced into the autoclave. After the pressure was raised to 2.5 kg/cm$^2$(G), hydrogen introduction was stopped. Ethylene was introduced into the autoclave to adjust the pressure of 10 kg/cm$^2$(G). The pressure was maintained at this level and the temperature was maintained at 85° C. during the polymerization. The polymerization time and results were shown in Table 8.

TABLE 8

| Example No. | polymerization time (hours) | Efficiency of catalyst (Kg-PP/g-Ti)* | Melt index of polymer (g/10 min) | Bulk density polymer (g/ml) |
|---|---|---|---|---|
| Ex. 24 | 2 | 537 | 1.03 | 0.35 |
| Ex. 25 | 4 | 906 | 0.87 | 0.35 |

*kg-pe/g-Ti = kg-polyethylene/g-Ti

Referring to the detailed description and foregoing examples, in comparison with the prior art, the catalyst system used in olefinic polymerization of the present invention has significant advantages as follows:

1. The activity of the catalyst of the present invention is very high, so that the amount of the residual catalyst in resultant polymer is very small. Polymers with high quality can be obtained without any further treatment after polymerization.

2. When polymerization time is extended, there is little reduction in catalyst activity. The catalyst is not only suitable for homopolymerization, but also suitable for block copolymerization.

3. The resultant polymer has very high sterospecificity using the catalyst system of the present invention, so that it is unnecessary to separate out the atactic polymer and the manufacturing process is simplified.

4. Polymers of high melt indexes, prepared by the process of the present invention, show little reduction in stereosecificity. Moreover, the activity of the catalyst increased at the same time. This character of the catalyst is suitable for preparing products with various melt indexes.

5. The resultant polymer using the catalyst system of the present invention has a narrow particle size distribution, with very low amounts of fine powder, and high bulk density. This character of the catalyst is beneficial to the polymerization process and manufacturing process.

6. When the polymerization temperature is increased, both of the activity of the catalyst and stereospecificity of the resultant polymer are increased. This is advantageous to the use of high temperatures in the polymerization process, thus making it unnecessary or reducing the necessity of removing the heat of polymerization from the autoclave. In this manner, energy consumed for cooling is saved.

7. The catalyst system of the present invention is free from benzoates which have an unpleasant odor. It is, therefore, unnecessary to include deodorization in the manufacturing process.

8. The catalyst system of the present invention is free from halogen-containing alkyl aluminum, so that the chlorine content of the resultant polymer is very low, and the corrosion of equipments used in polymerization and manufacturing processes is much reduced or does not occur.

9. The catalyst system of the present invention has wide usability, it is suitable for various methods of polymerization and for various olefins.

10. The operation conditions in the process of preparing the catalyst are not severe. The consumption of the starting material, titanium tetrachloride, is relatively low. The efficiency of the equipment used in the processes of the present invention is relatively high.

From the said advantages, when the catalyst system of the present invention is used in the preparation of polyolefins, the quality of the products and the rate of return on investment of the production equipment are improved and product cost is decreased.

What is claimed is:

1. A process for preparing a catalyst component comprising the steps of:
   (A) dissolving magnesium halide compounds selected from the group consisting of magnesium halide, complexes of magnesium halide with water or alcohol, and derivatives of magnesium halide wherein a halogen atom is substituted by an alkyl group or a haloalkyl group in a solvent mixture of an organic epoxy compound and an organic phosphorus compound to form a homogeneous solution, the organic epoxy compound being selected from the group consisting of oxides of aliphatic olefins and diolefins, oxides halogenated aliphatic olefins and diolefins, and glycidyl ethers all having 2 to 8 carbon atoms selected from the group consisting of ethylene oxide, propylene oxide, butylene oxide, butadiene oxide, butadiene dioxide, epoxy chloropropane, methyl glycidyl ether and diglycidyl ether; and the organic phosphorus compound being selected from the group consisting of trimethyl phosphate, triethyl phosphate, tributyl phosphate, triphenyl phosphate, trimethyl phosphite, triethyl phosphite, tributyl phosphite and triphenyl phosphite;

(B) mixing the homogeneous solution with a liquid titanium tetrahalide having the formula $TiX_n(OR)_{4-n}$ wherein X is halogen, R is an alkyl group being identical or different, and n is an interger of 0 to 4;

(C) adding at least one auxiliary precipitant selected from the group consisting of organic carboxylic acid anhydrides, organic carboxylic acids, ethers and ketones to form a precipitate;

(D) adding at least one polycarboxylic acid ester when the precipitate appear; and (E) separating the precipitate from the mixture and treating the separated precipitate with titanium tetrahalide or a mixture of titanium tretrahalide in an inert diluent.

2. A process according to claim 1, which further comprises the step of:

(F) Washing the treated precipitate with an inert diluent.

3. A process according to claim 1, wherein said auxiliary precipitant is an organic carboxylic acid anhydride.

4. A process according to claim 3, wherein the organic carboxylic acid anhydride is phthalic acid anhydride.

5. A process according to claim 1, wherein the amount of said auxiliary precipitant added is 0.03 to 1.0 moles per mole of magnesium halide.

6. A process according to claim 2, wherein the inert diluent for washing the precipitate is 1,2-dichloroethane.

7. A catalyst component consisting essentially of about 1.5-6.0% by weight of titanium, about 10-20% by weight of magnesium, about 40-70% by weight of halide selected from the group consisting of chlorine, bromine and iodine; about 5-25% by weight of a polycarboxylic ester selected from the group consisting of the esters of aliphatic, aromatic and alicyclic polycarboxylic acids; and about 0.1-2.5% by weight of an organic phosphorus compound selected from the group consisting of alkyl and aryl esters of phosphoric acid and phosphorous acid wherein each alkyl has 1 to 6 carbon atoms and each aryl has 6 to 10 carbon atoms, said catalyst component being prepared by a process having the following steps:

(a) dissolving in a solvent mixture a magnesium halide compound selected from the group consisting of magnesium halide, complexes of magnesium halide wherein the halide is replaced by an alkyl group or a haloalkyl group; the solvent mixture consisting of an organic epoxy compound, selected from the group consisting of oxides of aliphatic olefins and dioefins, oxides of halogenated aliphatic olefins and dioefins, glycidyl ethers all having 2 to 8 carbon atoms, and an organic phosphorus compound selected from the group consisting of alkyl phosphates, aryl phosphates, aralkyl phosphates, alkyl phosphites, aryl phosphites and aralkyl phosphites where alkyl has one to four carbon atoms and aryl has six to ten carbon atoms to form a homogeneous solution;

(b) mixing the homogeneous solution with a liquid titanium compound having the formula $TiX_n(OR)_{4-n}$ wherein X is halogen, R is an alkyl group being identical or different, and n is an integer of 0 to 4;

(c) adding at least one auxiliary precipitant selected from the group consisting of carboxylic acid anhydrides, carboxylic acids, ethers and ketones to form a precipitate;

(d) adding a polycarboxylic acid ester when a precipitate appears;

(e) separating the precipitate from the mixture and treating the separating precipitate with a titanium compound, $TiX_n(OR)_{4-n}$ wherein X is halogen, R is a hydrocarbon group and may be identical or different, and n is an interger of from 0 to 4, or a mixture thereof in an inert diluent; and (f) washing the treated precipitate with an organic inert diluent.

8. A catalyst component according to claim 7, wherein said polycarboxylic ester is selected from the group consisting of the esters of aromatic polycarboxylic acids.

9. A catalyst component according to claim 8, wherein said polycarboxylic ester is selected from the group consisting of dibutyl phthalate and di-isobutyl phthalate.

10. A catalyst component according to claim 7, wherein said auxiliary precipitant is an anhydride of organic carboxylic acid.

11. A catalyst component according to claim 10, wherein the anhydride or organic carboxylic acid is phthalic anhydride.

12. A catalyst component according to claim 7, wherein the amount of said auxiliary precipitant added is 0.03 to 1.0 moles per mole of magnesium halide.

13. A catalyst component according to claim 7, wherein the inert diluent used in the step (F) is 1,2-dichloroethane.

14. A catalyst composition for use in olefinic polymerization comprising component (A) a catalyst component according to claim 7, and (B) an organic aluminum compound having the general formula $AlR_{n'}X_{3-n'}$ wherein R is hydrogen, or a hydrogen group having 1-20 carbon atoms, X is halogen, and n' is an integer of from 1 to 3.

15. A catalyst composition according to claim 14, wherein said catalyst composition further comprises component (C): an organic silicon compound having the general formula $R_{n'}Si(OR')_{4-n'}$ wherein n' is an integer of from 1 to 3, R and R' each independently are alkyl, cycloalkyl, aryl, halogen, hydrogen and alkyl group substituted by halogen.

* * * * *

UNITED STATES PATENT AND TRADEMARK OFFICE
CERTIFICATE OF CORRECTION

PATENT NO. : 4,784,983

DATED : November 15, 1988

INVENTOR(S) : Binquan Mao et al.

It is certified that error appears in the above-identified patent and that said Letters Patent is hereby corrected as shown below:

On the cover page under the heading, [73] Assignee:

insert --China Petrochemical Corporation, Beijing, China--

Signed and Sealed this

Twenty-eighth Day of August, 1990

Attest:

HARRY F. MANBECK, JR.

Attesting Officer

Commissioner of Patents and Trademarks